Patented Apr. 5, 1932

1,852,295

UNITED STATES PATENT OFFICE

HARRY L. FISHER, OF AKRON, OHIO, ASSIGNOR TO THE B. F. GOODRICH COMPANY, OF NEW YORK, N. Y., A CORPORATION OF NEW YORK

RUBBER CONVERSION PRODUCTS AND METHOD OF MAKING SAME

No Drawing.   Application filed December 28, 1926.   Serial No. 157,625.

This invention relates to rubber conversion products of a type formed by the reaction thereon of isomerizing reagents for rubber and to methods of producing such conversion products.

The present invention is based on the discovery that certain compounds when admixed with rubber and a phenol and subjected to moderately elevated temperatures liberate in the rubber-phenol mixture isomerizing agents for rubber which react with the rubber to form isomeric conversion products of rubber. Substances which operate in this manner fall into no present accepted group or class, but may be considered to form an empirical class of substances having in common the above indicated properties. Such an empirical class has been found to include chlorinated rubber, rubber hydrochloride, rubber sulfur chloride, chlorinated rubber hydrochloride, pinene hydrochloride, diphenylamine hydrochloride, trichloraniline hydrochloride, m-nitraniline hydrochloride, mercuric chloride, stannic chloride, napthalene tetrachloride, triphenyl chlormethane, zinc bromide, mercuric bromide, rubber dibromide, diphenylamine hydrobromide, cadmium sulfate, aluminum sulfate, mercuric sulfate, diphenylamine sulfate, and diphenylamine trichloracetate. These compounds when heated in the reaction mixture probably liberate their corresponding acids, such as hydrochloric acid, hydrobromic acid, sulfuric acid or trichloracetic acid, all of which have been proven by test to be isomerizing agents for rubber under the influence of heat, and this is believed to be a tenable theory of the above indicated reaction which effects the conversion of rubber to an isomer of rubber having a less unsaturation than rubber.

I have found that this reaction between the rubber and any of the hereinabove indicated compounds in the presence of a phenol may be effected by dispersing the latter ingredients directly into rubber and thereafter subjecting the admixture to heat at elevated temperatures for such time as may be necessary to complete the conversion reaction.

What part the phenol takes in the reaction with the above indicated reagents is not now definitely known, but numerous experiments indicate that it acts somewhat as a catalyst with the compounds hereinabove mentioned to form in the reaction mixture isomerizing agents which effect the conversion of the rubber.

In order to illustrate the processes described hereinabove in greater detail, the following examples are given below:

*Example 1.*—Mix into 100 parts by weight of rubber 20 parts by weight of phenol and 20 parts by weight of mercuric chloride, as by adding the phenol and the chloride to the rubber on the mill during mastication thereof. When the ingredients have been thoroughly admixed, subject the batch to heat as by placing it in an oven maintained at 134° C. and continue the heating for about twenty hours. When cooled, the resulting conversion product is found to be a strong, firm, thermoplastic material. This conversion product needs generally to be prepared or reworked to adapt it as a raw material for commercial use. Such reworking may consist of homogenizing the mass, as by comminution, by mastication or by solution in an organic solvent, and it is also desirable in many cases to wash the product free of residual acid and other water-soluble impurities. The above indicated procedure of reworking the conversion product can be carried out without effecting any deep seated change in the conversion product.

*Example 2.*—Into 100 parts by weight of rubber are admixed, as by direct milling, 20 parts of rubber hydrochloride and 20 parts of resorcinol. When the ingredients have been thoroughly admixed the batch is subjected to heat, as by placing it in an oven maintained at 324° F. for 20 hours. When cooled the resulting conversion product is found to be a hard, firm, tough material.

*Example 3.*—Take 100 parts by weight of rubber and admix therewith 10 parts of catechol and 20 parts of diphenylamine hydrochloride. When the batch has been thoroughly admixed, place in a suitable heater maintained at 320° F. for about 20 hours, more or less, or until the conversion is complete. A hard, tough material is thereby produced.

In general, a batch consisting of rubber 100 parts by weight, a phenol 10 to 20 parts and any one of the compounds selected from the above empirical class, 20 to 30 parts, when treated as above described in the preceding examples will yield conversion products of the general type described therein. Specifically the following proportions to 100 parts of rubber have given satisfactory conversion products, the numeral indicating parts by weight: (a) chlorinated rubber 30, resorcinol 20; (b) rubber sulfur chloride 30, resorcinol 20; (c) pinene hydrochloride 30, resorcinol 20; (d) trichloraniline hydrochloride 30, resorcinol 20; (e) mercuric chloride 20, catechol 20; (f) stannic chloride (crystalline) 30, resorcinol 20; (g) naphthalene tetrachloride 30, resorcinol 20; (h) triphenyl chlormethane 30, resorcinol 20; (i) mercuric bromide 30, resorcinol 20; (j) rubber dibromide 30, resorcinol 20; (k) diphenylamine hydrobromide 25, resorcinol 20; (l) cadmium sulfate (crystalline) 30, resorcinol 20; (m) aluminum sulfate (crystalline) 30, resorcinol 20; (n) mercuric sulfate 30, resorcinol 20; (o) diphenylamine sulfate 20, resorcinol 20; (p) diphenylamine trichloracetate 30, resorcinol 20.

Experiment has shown that the reagents above specified will in general react with rubber in solution, when subjected to steam bath temperatures for from 1 to 3 days, but that larger proportions of reagents are necessary to carry out the reaction, generally the phenol and the compound of the above noted empirical class must be used in quantities equaling the weight of the rubber and the reaction is facilitated by using several times the weight of phenol. The following example is illustrative of this embodiment of my invention and is here given as a type, it being understood that the compounds of the empirical class above defined may in general be substituted therein in place of the mercuric chloride, specifically recited.

*Example 4.*—Mix into 100 parts by weight of a 5 per cent solution of rubber 20 parts by weight of phenol and 5 parts by weight of mercuric chloride, thoroughly admixing the ingredients. Place the admixture in a suitable receptacle, under reflux, if desired, to prevent escape of solvent, and apply heat thereto, as on a steam bath, and continue the heating for two days, or for such period as may be necessary to complete the conversion reaction. The resulting liquid reaction mixture contains the rubber solvent and phenol, which may be removed therefrom by distillation, leaving a solid residue comprising the conversion product. This product may be homogenized and prepared for industrial uses as hereinabove described in connection with Example 1. Where the conversion product is to be used in solution, the liquid reaction mixture may in certain cases be directly employed.

It will be obvious from the above examples that phenols other than phenol itself may be employed in this process, such as cresol, catechol, the naphthols and p-chlorphenol. The alternative procedures indicated in this paragraph need not be specifically set forth herein since they are in all substantial respects similar to the procedures described above.

Analysis of the purified conversion products prepared in any of the ways hereinabove described indicates that these conversion products are isomers of rubber having a chemically less unsaturation than rubber. They are generally tough, strong solid materials which are useful as raw material in various industrial operations.

It is to be understood that the above examples are given merely by way of illustration and that various modifications in the proportion of the ingredients specified and in the time and temperature of carrying out the conversion reaction may be employed by those skilled in this art without departing from the principles of this invention.

What I claim is:

1. The method of treating rubber which comprises admixing with rubber a phenol and a substance selected from the empirical class consisting of chlorinated rubber, rubber hydrochloride, rubber sulfur chloride, chlorinated rubber hydrochloride, pinene hydrochloride, diphenylamine hydrochloride, trichloraniline hydrochloride, m-nitraniline hydrochloride, mercuric chloride, stannic chloride, naphthalene tetrachloride, triphenyl chlor-methane, zinc bromide, mercuric bromide, rubber dibromide, diphenylamine hydrobromide, cadmium sulfate, aluminum sulfate, mercuric sulfate, diphenylamine sulfate, and diphenylamine trichloracetate, and heating the mix.

2. The method of treating rubber which comprises admixing with rubber a phenol and a substance selected from the empirical class consisting of chlorinated rubber, rubber hydrochloride, rubber sulfur chloride, chlorinated rubber hydrochloride, pinene hydrochloride, diphenylamine hydrochloride, trichloraniline hydrochloride, m-nitraniline hydrochloride, mercuric chloride, stannic chloride, naphthalene tetrachloride, triphenyl chlor-methane, zinc bromide, mercuric bromide, rubber dibromide, diphenylamine hydrobromide, cadmium sulfate, aluminum sulfate, mercuric sulfate, diphenylamine sulfate, and diphenylamine trichloracetate, heating the mix, and reworking the product for industrial use.

3. The method of making conversion products of rubber which comprises admixing with rubber a phenol and a substance capable of liberating in the rubber-phenol mix, under the influence of heat, an isomerizing agent for rubber of the class consisting of hydrochloric acid, hydrobromic acid, sulphuric acid and trichloracetic acid, and heating the mix.

4. A composition of matter comprising the product of the reaction, under the influence of heat, of rubber, a phenol and a substance capable of liberating in the rubber-phenol mix, under the influence of heat, an isomerizing agent for rubber of the class consisting of hydrochloric acid, hydrobromic acid, sulphuric acid and trichloracetic acid.

5. The method of treating rubber which comprises admixing with rubber a phenol and a substance selected from a class consisting of hydrochlorides and hydrobromides of a weak organic base capable of liberating a hydrogen halide in the mix at moderately elevated temperatures, and heating the mix.

6. The method of treating rubber which comprises admixing with rubber a phenol and a substance selected from the group consisting of diphenylamine hydrochloride, trichloraniline hydrochloride, m-nitraniline hydrochloride and diphenylamine hydrobromide, and heating the mix.

7. The method of preparing conversion products which comprises treating rubber with a phenol and with diphenylamine hydrochloride.

8. The method of treating rubber which comprises admixing with rubber a phenol and a substance selected from the group consisting of diphenylamine hydrochloride, trichloraniline hydrochloride, m-nitraniline hydrochloride and diphenylamine hydrobromide, and heating the mix and thereafter reworking the product for industrial use.

9. A composition of matter comprising the product of the reaction, under the influence of heat and in the presence of phenol, of rubber and a substance selected from a class consisting of hydrochlorides and hydrobromides of a weak organic base capable of liberating a hydrogen halide at moderately elevated temperatures.

10. A composition of matter comprising the product of the reaction, under the influence of heat and in the presence of phenol, of rubber and a substance selected from the group consisting of diphenylamine hydrochloride, trichloraniline hydrochloride, m-nitraniline hydrochloride and diphenylamine hydrobromide.

11. The method of making conversion products of rubber which comprises admixing with rubber a phenol and a substance capable of liberating in the rubber-phenol mix under the influence of heat a strong non-oxidizing acid, and heating the mix.

12. A composition of matter comprising the product of the reaction, under the influence of heat, of rubber, a phenol, and a substance capable of liberating in the rubber-phenol mix under the influence of heat a strong non-oxidizing acid.

In witness whereof I have hereunto set my hand this 20th day of November, 1926.

HARRY L. FISHER.